(12) United States Patent
Reilly et al.

(10) Patent No.: US 7,240,740 B2
(45) Date of Patent: Jul. 10, 2007

(54) DIAPHRAGM VALVE WITH PIVOTING CLOSURE MEMBER

(75) Inventors: William J. Reilly, Langhorne, PA (US); Joseph K. Banis, Alpha, NJ (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 10/759,714

(22) Filed: Jan. 16, 2004

(65) Prior Publication Data

US 2005/0155777 A1   Jul. 21, 2005

(51) Int. Cl.
*A62C 35/00* (2006.01)

(52) U.S. Cl. .......................... 169/17; 169/16; 169/19; 169/20; 169/22; 137/488; 251/61; 251/364

(58) Field of Classification Search ............... 169/16, 169/17, 19, 20, 21, 22; 137/79, 488, 489; 251/12, 61, 359, 364

See application file for complete search history.

(56) References Cited

U.S. PATENT DOCUMENTS

| 173,452 A | | 2/1876 | Donovan | |
|---|---|---|---|---|
| 372,220 A | * | 10/1887 | Grinnell | 169/22 |
| 1,662,839 A | * | 3/1928 | Tyden | 169/22 |
| 1,790,467 A | * | 1/1931 | Griffith | 169/22 |
| 2,597,474 A | * | 5/1952 | Griffith | 169/19 |
| 2,900,029 A | * | 8/1959 | Herkimer | 169/22 |
| 3,135,332 A | * | 6/1964 | Merdinyan | 169/22 |
| 3,630,224 A | | 12/1971 | Kalvelage | |
| 4,492,362 A | | 1/1985 | Garcia, Jr. et al. | |
| 4,552,221 A | * | 11/1985 | Klein | 169/17 |
| 4,587,954 A | | 5/1986 | Haber | |
| 4,733,689 A | | 3/1988 | Osnas | |
| 4,923,601 A | | 5/1990 | Drori | |
| 5,004,010 A | | 4/1991 | Huet | |
| 5,313,977 A | | 5/1994 | Bergsma et al. | |
| 5,346,179 A | | 9/1994 | Lochmann | |
| 5,464,064 A | * | 11/1995 | Weingarten | 169/22 |
| 5,605,175 A | | 2/1997 | Bergsma et al. | |
| 6,530,556 B1 | | 3/2003 | Boecking | |
| 6,557,645 B1 | * | 5/2003 | Ringer | 169/17 |

* cited by examiner

*Primary Examiner*—Steven J. Ganey
(74) *Attorney, Agent, or Firm*—Synnestvedt & Lechner LLP (57) ABSTRACT

A valve is disclosed having an inlet duct aligned with an outlet duct and an angularly oriented elliptical seat positioned between them. A pressure chamber faces the seat. A pivoting valve closure member is positioned between the pressure chamber and the seat. An asymmetrical rolling diaphragm is attached to the closure member and defines part of the pressure chamber. A seat engaging surface on the side of the closure member opposite the pressure chamber is sealingly engageable with the seat to close the valve. The valve closure member is pivoted into the closed positioned by pressurizing the pressure chamber. The valve remains closed against hydraulic pressure in the inlet duct. The valve is permitted to open by de-pressurizing the pressure chamber, allowing the closure member to pivot out of engagement with the seat. Fluid may then flow from the inlet duct to the outlet duct.

28 Claims, 7 Drawing Sheets

DIAPHRAGM VALVE WITH PIVOTING CLOSURE MEMBER

FIELD OF THE INVENTION

This invention relates to valves for control of fluid flow, and especially valves for use in fire suppression sprinkler systems.

BACKGROUND OF THE INVENTION

Automatic sprinkler systems for fire protection of buildings such as offices, warehouses, hotels, schools, apartments and the like are often required when there is a significant amount of combustible matter present in the building. The combustible matter may be found in the materials from which the building itself is constructed, as well as in the building contents, such as furnishings or stored goods.

Of the various types of automatic sprinkler systems available, the pre-action systems find widespread use. Pre-action systems use an actuator which responds to a combination of signals from different detectors to trip a valve which allows water to flow from a pressurized water source to the sprinkler piping network. The water is then distributed onto the fire from the sprinkler heads. Similar to the so-called "dry-pipe" systems, the piping network in the pre-action system is normally filled with air or nitrogen (and not water) prior to actuation. The pre-action system can thus be used in unheated environments which are subject to below freezing temperatures without fear of pipes bursting due to water within the pipes expanding upon freezing.

When sufficiently pressurized, the behavior of the gas within the piping network may be used to indicate a fire condition and trigger actuation of the pre-action system. Heat from the fire will cause sprinkler heads to open, allowing pressurized gas to escape from the piping network and result in a pressure drop within the system. Actuation of the system may be effectively triggered by this pressure drop through the aforementioned actuator.

For effective system operation, it is desired that the valve controlling the flow of water from the pressurized source to the piping network be able to conduct a significant volume of water at a relatively high flow rate with low pressure loss. These characteristics ensure that the sprinkler system has adequate water flow and pressure to fight the fire, and a short reaction time in order to prevent the spread of the fire. The reaction time is the duration measured between the time at which the valve is opened and the time at which water begins to flow from the sprinkler heads. Reaction times and pressure loss both increase in significance as the size of the piping network increases.

A valve that provides high flow rate with low pressure loss is desired for use in pre-action, as well as dry-pipe fire suppression sprinkler systems.

SUMMARY OF THE INVENTION

The invention concerns a valve for controlling fluid flow. The valve comprises an inlet duct and an outlet duct in fluid communication with the inlet duct. A seat is positioned between the inlet duct and the outlet duct, and a pressure chamber is positioned in facing relation with the seat. A closure member is positioned between the pressure chamber and the seat. The closure member has a seat engaging surface facing the seat, the closure member being pivotable about an axis to bring the seat engaging surface into and out of sealing engagement with the seat to open and close the valve.

A diaphragm is sealingly positioned between the pressure chamber and the closure member. The diaphragm is attached to the closure member opposite the side having the seat engaging surface. The diaphragm is flexible and transfers pressure from the pressure chamber onto the closure member. The pressure pivots the closure member into sealing engagement with the seat when the pressure chamber is pressurized thereby closing the valve. The closure member is pivotable out of engagement with the seat when the pressure chamber is depressurized, thereby allowing the valve to open.

The valve seat may have a non-circular shape, preferably elliptical. The elliptical seat allows the inlet duct to be substantially coaxially aligned with the outlet duct, thereby reducing pressure loss of fluid flowing through the valve.

In one valve embodiment, the seat comprises a loop having an inner and an outer perimeter. A first projection extends along the inner perimeter, and a second projection extends along the outer perimeter. Both of the projections face the valve closure member for sealing engagement therewith upon pivoting of the valve closure member. The first and second projections are in spaced apart relation to each other and define a space between them. Preferably, this space is vented to the ambient to increase the closure force on the closure member. The loop may be comprised of a resilient, flexible material, or it may engage a resilient, flexible substrate mounted on the closure member to effect a seal between the seat and the closure member.

In another embodiment, the loop is mounted on the closure member and engages the seat. Again, the loop may be comprised of a resilient, flexible material or it may engage a resilient, flexible substrate comprising part of the seat to effect the valve closure member seal.

The invention also includes a fire suppression sprinkler system using a valve according to the invention.

DETAILED DESCRIPTION OF THE EMBODIMENTS

Figure 1:
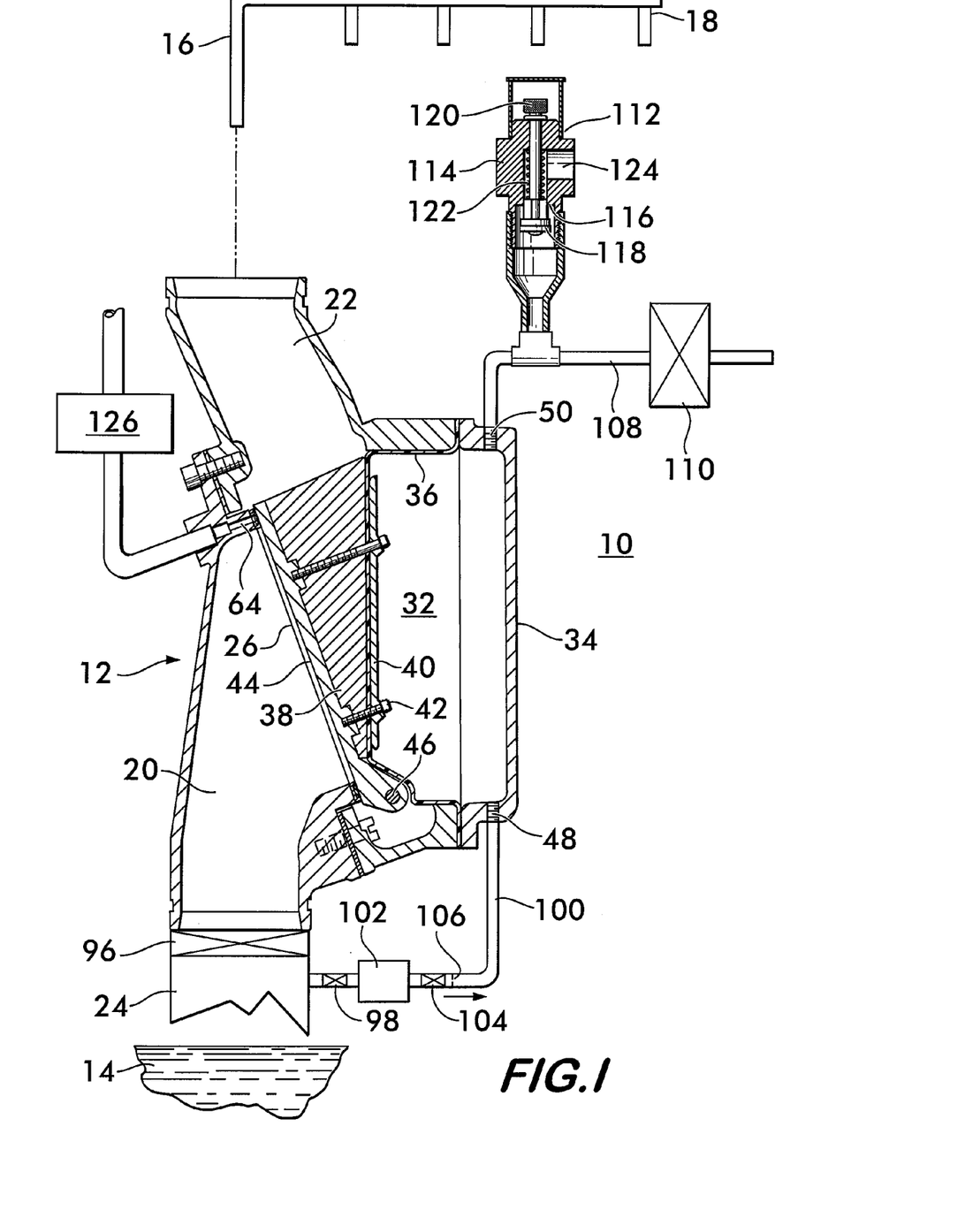
FIG. 1 is a partial view of a fire suppression sprinkler system using a valve according to the invention, various components being shown schematically or in longitudinal section.

FIG. 1 shows a fire suppression sprinkler system 10 using a valve 12 according to the invention. Valve 12 functions to control the flow of a fire suppressing fluid, such as water, from a pressurized source 14 to a piping network 16. Piping network 16 is in fluid communication with sprinkler heads 18 that are distributed throughout the building or other structure in which the system 10 is installed. Upon a fire condition, valve 12 is opened, allowing water to flow from the source 14, through the piping network 16 to be discharged onto the fire by the sprinkler heads 18. A more detailed description of the valve, other system components, as well as system operation is provided below.

Figure 2:
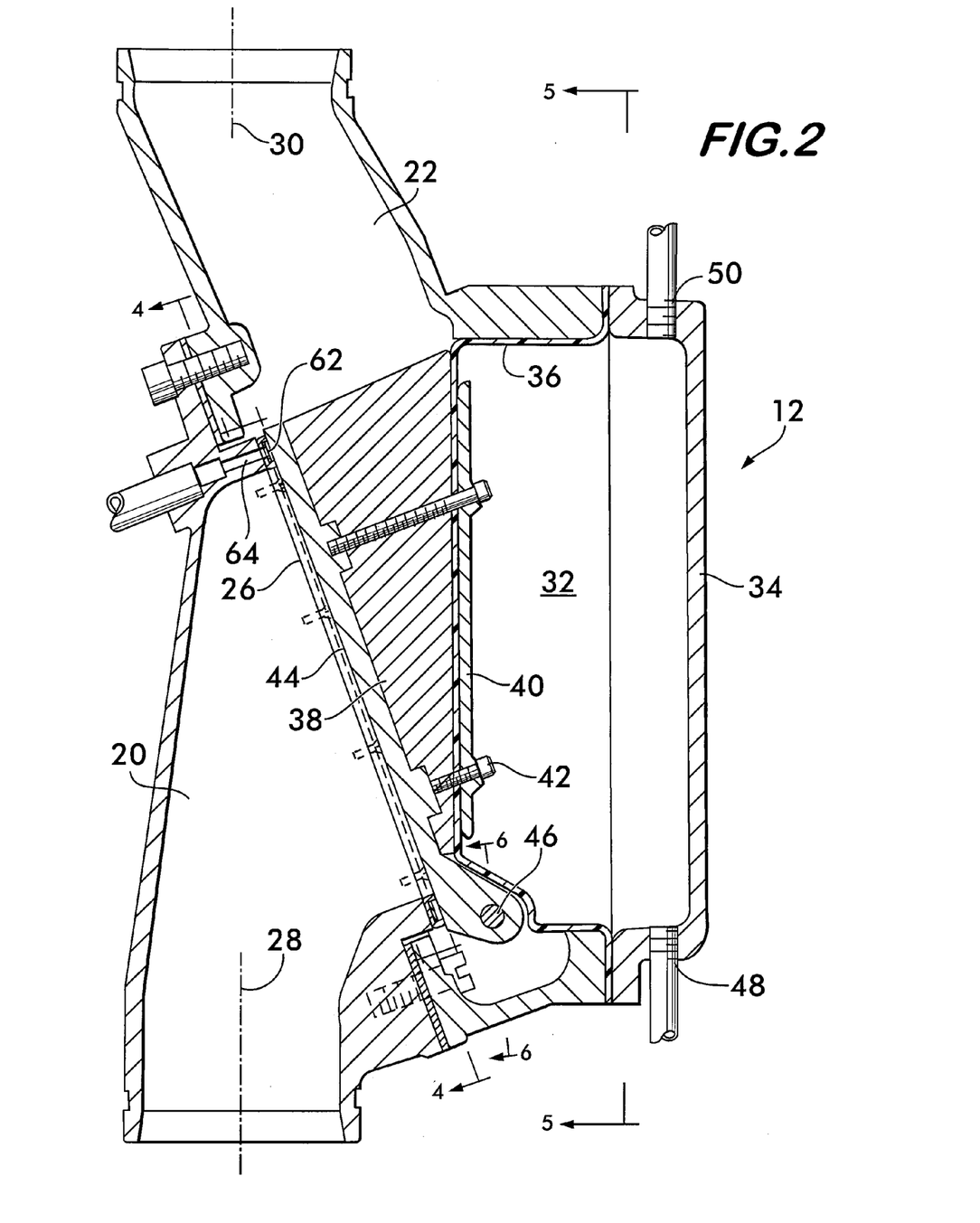
FIG. 2 is a longitudinal sectional view of the valve shown in FIG. 1 on an enlarged scale, the valve being shown in a closed configuration.
Figure 4:
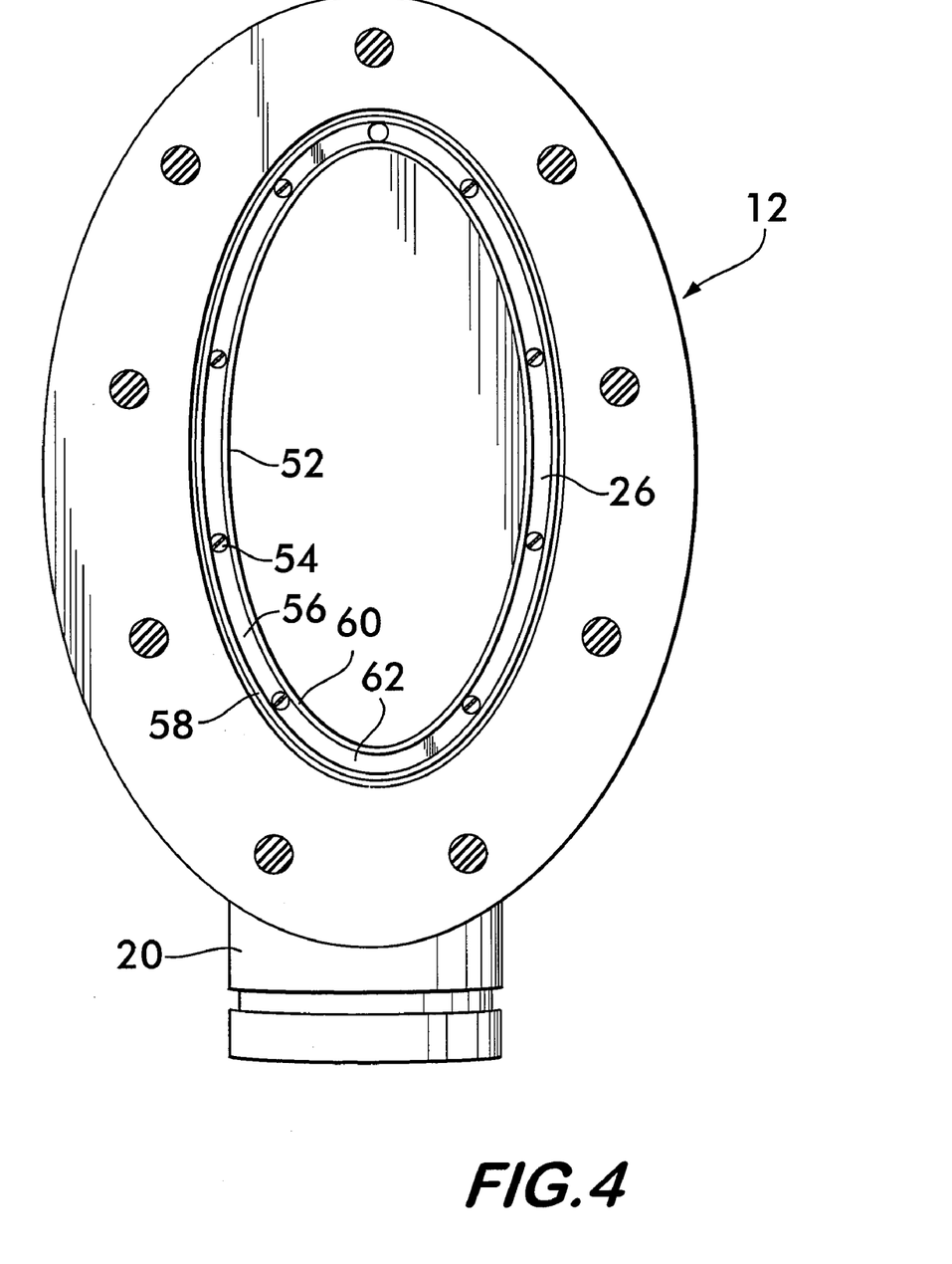
FIG. 4 is a sectional view taken at line 4—4 of FIG. 2.

Valve 12 comprises an inlet duct 20 and an outlet duct 22. Inlet duct 20 is attachable to a main conduit 24 providing fluid communication between water source 14 and the valve, and the outlet duct 22 is attachable to the piping network 16 providing fluid communication between the valve 12 and the sprinkler heads 18. As shown in FIG. 2, a valve seat 26 is positioned between the inlet duct 20 and outlet duct 22. Seat 26 is preferably angularly oriented relative to respective longitudinal axes 28 and 30 of the inlet duct 20 and outlet duct 22. Preferably, seat 26 has an elliptical shape as illustrated in FIG. 4. The angularly oriented elliptical seat 26 allows the inlet duct 20 to be substantially coaxially aligned with the outlet duct 22. This provides for a substantially straight fluid flow path through valve 12 and thereby reduces system pressure loss at the valve as compared with valves wherein the water must change direction or flow around an obstruction, such as a valve component. The inlet and outlet ducts 20 and 22 are preferably made of cast iron, but may also be machined from brass for smaller sizes.

As further shown in FIG. 2, a pressure chamber 32 is located on valve 12 facing seat 26. Pressure chamber 32 is defined by a cover plate 34, preferably comprised of cast iron or brass and removable for valve servicing, and a resilient, flexible diaphragm 36 sealingly attached to the cover plate. Preferably, diaphragm 36 is a laminate membrane comprising a fabric layer providing strength, sandwiched between two polymer membranes providing flexibility and resilience. Preferred materials for the fabric layer are nylon, polyester and KEVLAR. The polymer membrane layers may comprise EPDM, nitrile compounds, as well as silicone rubber compounds.

Figure 5:
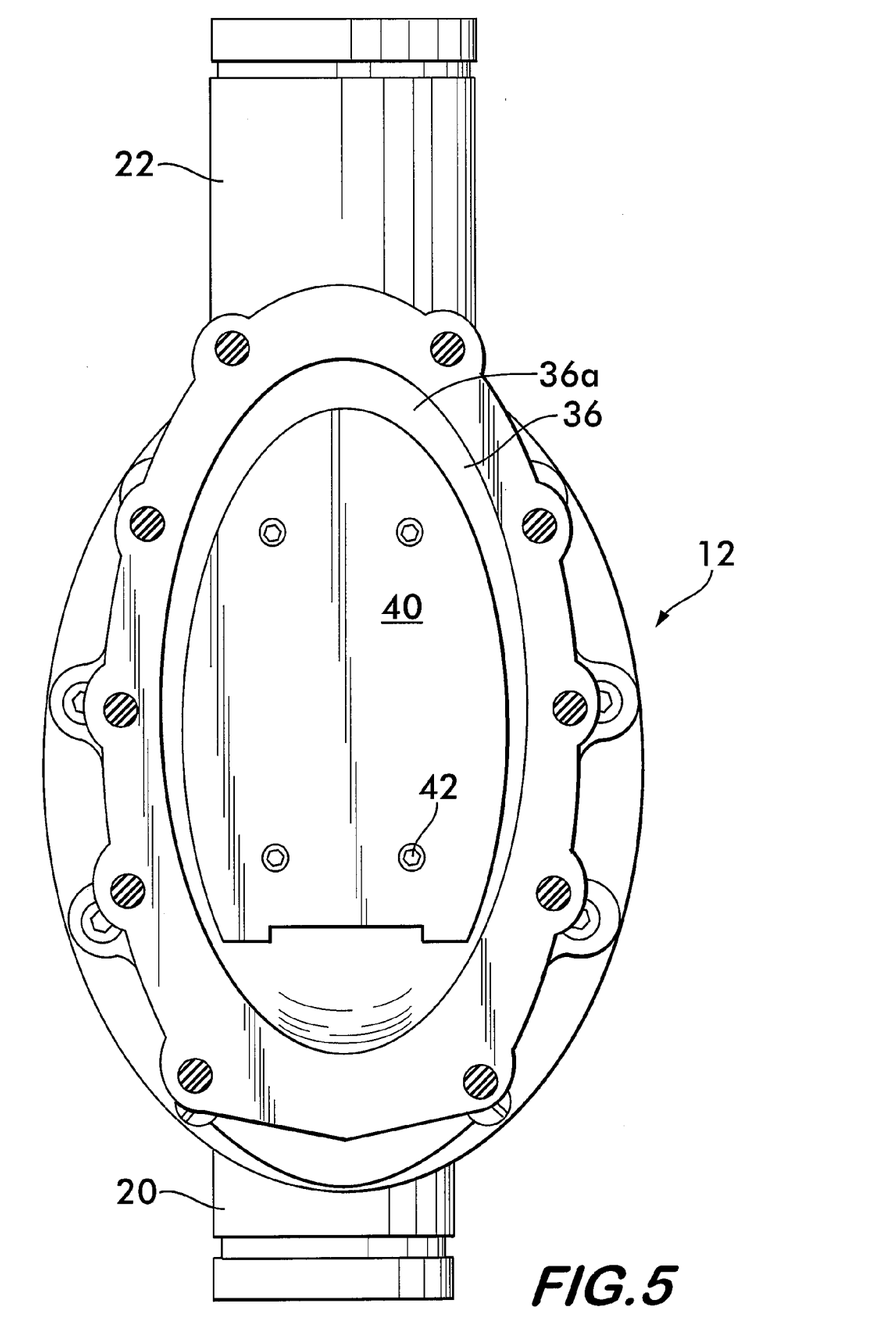
FIG. 5 is a sectional view taken at line 5—5 of FIG. 2.

Diaphragm 36 is attached to a valve closure member 38, also comprised preferably of cast iron or brass and positioned between the pressure chamber 32 and the seat 26. Attachment of the diaphragm 36 is conveniently effected using a retainer plate 40 bolted to the closure member 38 by fasteners 42. Preferably, as shown in FIG. 5, retainer plate 40 covers a substantial portion of the diaphragm 36 and serves to distribute the stresses over the diaphragm 36 during valve operation, described below.

Figure 3:
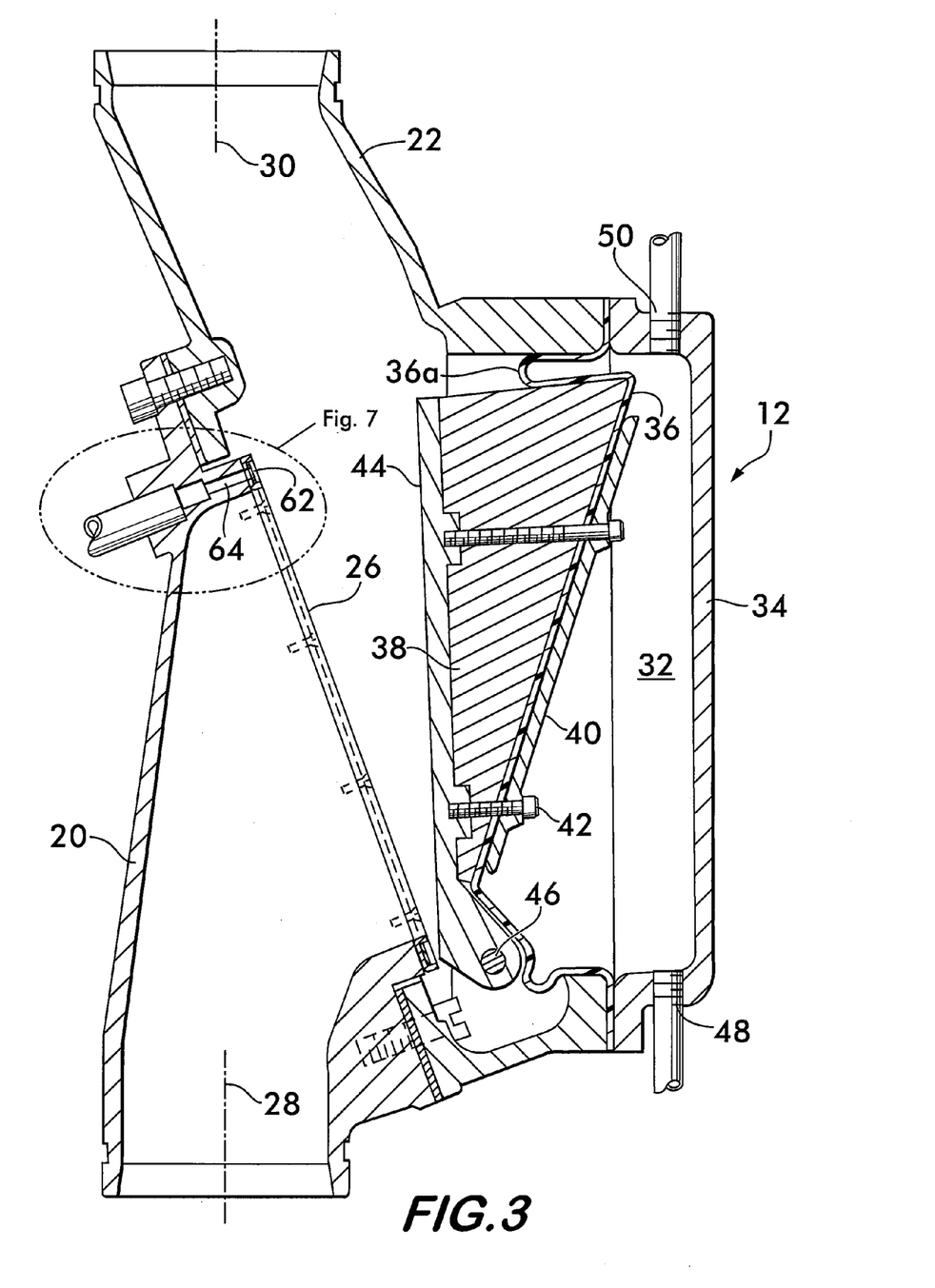
FIG. 3 is a longitudinal sectional view of the valve shown in FIG. 1 on an enlarged scale, the valve being shown in an open configuration.
Figure 6:
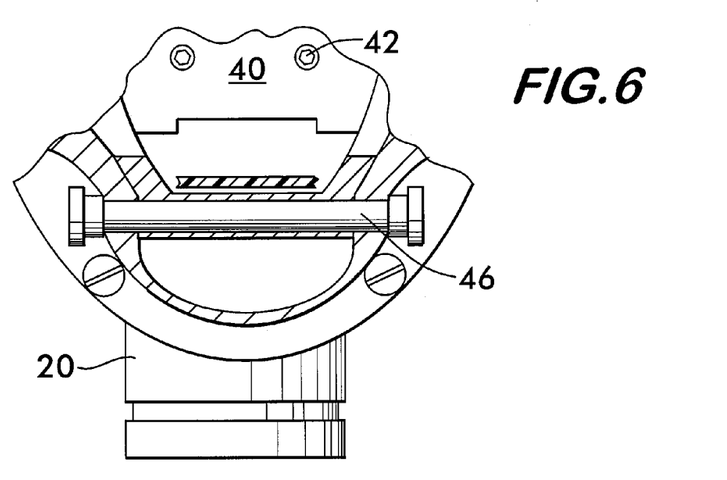
FIG. 6 is a partial sectional view taken at line 6—6 of FIG. 2.

As shown in FIGS. 2 and 3, valve closure member 38 has a seat engaging surface 44 positioned on the opposite side from the diaphragm 36 and facing seat 26. The valve closure member 38 is mounted so as to pivot about an axis 46 (shown in detail in FIG. 6), allowing the seat engaging surface 44 to sealingly engage seat 26 and close valve 12, as illustrated in FIG. 2, or to move the seat engaging surface 44 out of engagement with seat 26 and open valve 12, as shown in FIG. 3. The pivoting motion of valve closure member 38 is effected by pressurizing and depressurizing the pressure chamber 32. To this end, the pressure chamber 32 has an inlet 48 allowing fluid into the pressure chamber to pressurize it and close valve 12. An outlet 50 is provided in the pressure chamber to depressurize it (preferably by venting to the ambient), and thereby allow the valve 12 to open when the inlet duct 20 has a pressurized fluid acting hydraulically against the valve closure member 38. When the pressurizing fluid is a substantially incompressible liquid such as water, the inlet 48 and outlet 50 are preferably positioned at opposite ends of the pressure chamber 32 with the outlet higher than the inlet. This inlet-outlet configuration allows the pressurizing fluid to flow through the entire pressure chamber and ensures that it fills completely with the pressurizing fluid and helps avoid trapping of otherwise compressible gases such as air when the pressure chamber is pressurized. To ensure reliable valve operation, it is desirable to avoid trapped gas in the pressure chamber which could result in false activation of the sprinkler system 10 in the event of a pressure spike in the source 14.

The diaphragm 36 transmits the pressure to the valve closure member 38 as a "rolling diaphragm". This concept is best illustrated in FIGS. 3 and 5, wherein a portion around the perimeter of the diaphragm 36 is seen to roll as a loop 36a between the valve closure member 38 and a part of valve 12 forming the pressure chamber 32. Due to the pivoting nature of the valve closure member 38, the rolling diaphragm 36 is asymmetrical in that its rolling loop 36a is positioned predominantly opposite to the pivot axis 46 of the valve closure member, the rolling loop 36a being smaller and rolling over a smaller distance as it approaches the pivot axis 46. The asymmetrical rolling diaphragm 36 allows valve 12 to be made smaller and lighter than valves employing symmetrical rolling diaphragms, which normally employ a reciprocating piston as a closure member. The reciprocal motion of the piston requires more complicated constraints be built into the valve to guide the movement of the piston, thereby increasing the part count, as well as the size and weight of the valve in comparison with the valve 12 having an asymmetrical rolling diaphragm 36 and the pivoting valve closure member 38.

Figures 7, 8:
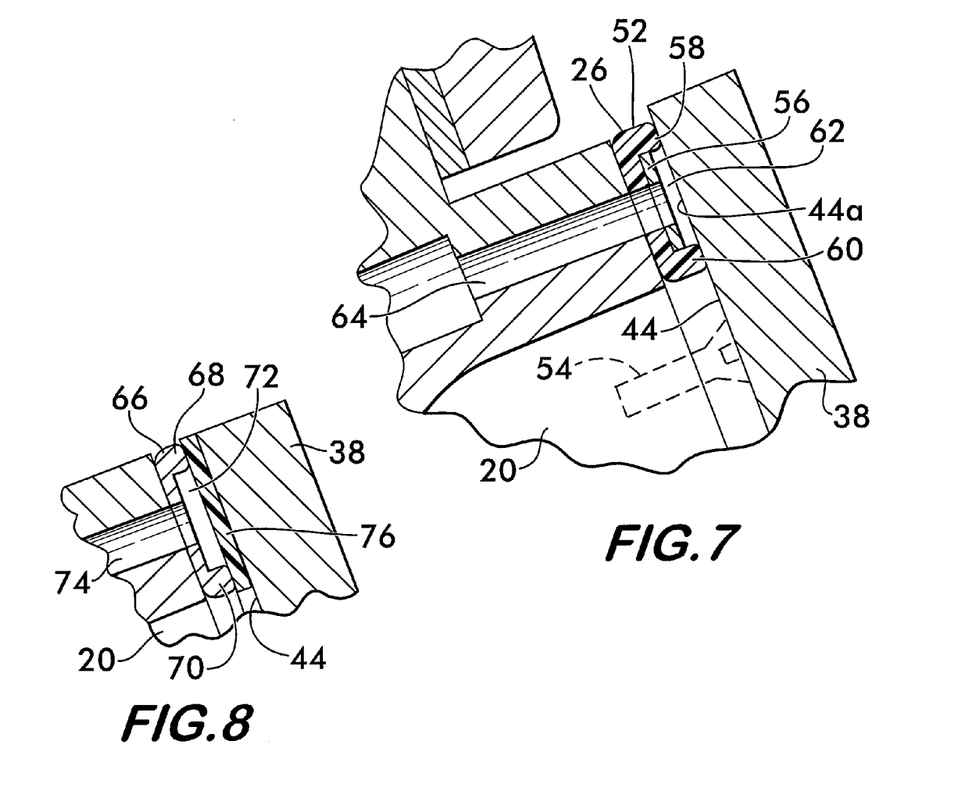
FIG. 7 is a partial sectional view on an enlarged scale taken from within the broken-line ellipse in FIG. 3.
FIG. 8 is a partial sectional view of an alternate embodiment of the configuration shown in FIG. 7.

When valve 12 is in the closed configuration shown in FIG. 2, a sealing engagement is effected between seat 26 and the seat engaging surface 44 of valve closure member 38. A variety of seal arrangements are feasible as illustrated in FIGS. 7–10. In one embodiment, shown in FIGS. 4 and 7, the valve seat 26 comprises a flexible, resilient loop 52 held to the inlet duct 20 by bolts 54 engaging a retainer rim 56 that extends around loop 52, the loop being sandwiched between rim 56 and the inlet duct 20. Loop 52 is preferably formed from an elastomeric compound and has two projections 58 and 60 extending around its inner and outer perimeters, the projections facing the valve closure member 38. Projection 58 is positioned along the outer perimeter of loop 52, and projection 60 is positioned in spaced relation to projection 58 along the inner perimeter of loop 52. The projections 58 and 60 engage the seat engaging surface 44 of closure member 38 to effect a fluid tight seal when the valve 12 is closed. The two projections define a space 62 between them. As best shown in FIGS. 2 and 7, space 62 is preferably vented to the ambient by an aperture 64 extending through seat 26. By venting space 62 to the atmosphere, the pressure forces holding the valve closure member 38 closed are augmented since the area 44a of seat engaging surface 44 positioned between the projections 58 and 60 will be at a lower pressure than area of the valve closure member exposed to the hydraulic pressure within the inlet duct 20, thereby further increasing the pressure differential between the inlet duct 20 and the pressure chamber 32 holding the valve in the closed configuration.

FIG. 8 shows another embodiment of seat 26 wherein a substantially rigid loop 66 is mounted on the inlet duct 20, the loop 66 having projections 68 and 70 extending along the loop's outer and inner perimeters in spaced relation to form a space 72 that is again vented to the ambient through an aperture 74. Loop 66 may be formed from a metal such as brass, bronze, iron, steel or other alloys. To ensure a fluid tight seal between the seat engaging surface 44 of valve closure member 38 and the loop 66, a flexible, resilient substrate 76 is mounted on the seat engaging surface 44. The substrate is aligned with the projections 68 and 70 for engagement therewith upon valve closing to ensure a fluid tight seal.

Figure 9:
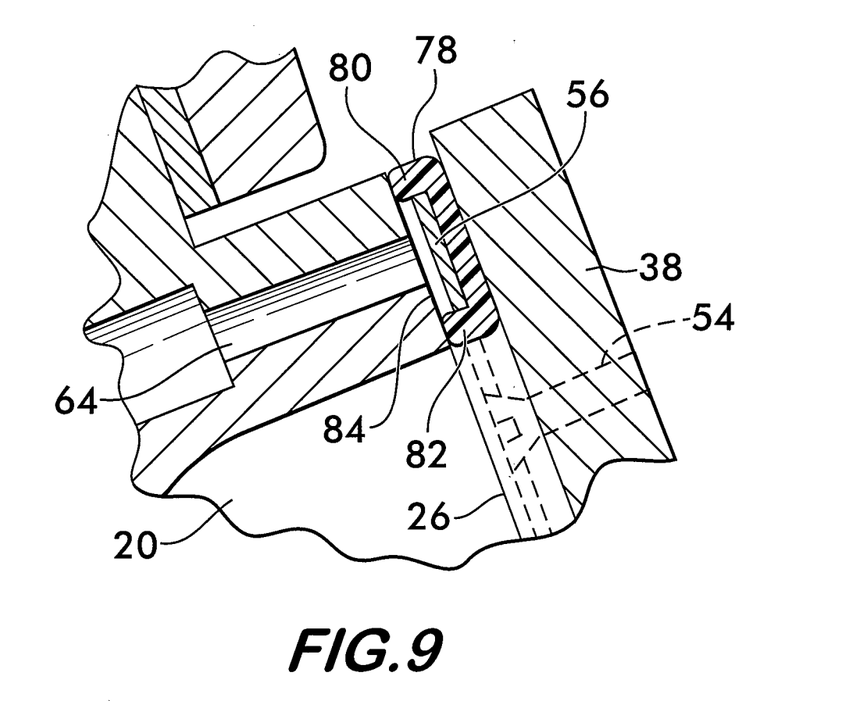
FIG. 9 is a partial sectional view of an alternate embodiment of the configuration shown in FIG. 7.
Figure 10:
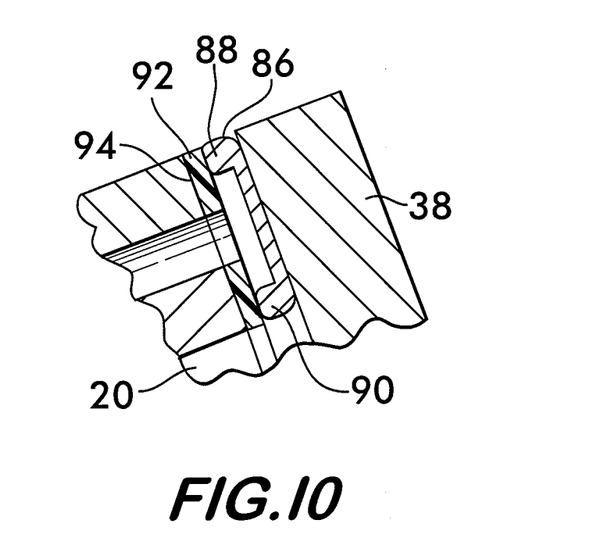
FIG. 10 is a partial sectional view of an alternate embodiment of the configuration shown in FIG. 9.

Alternately, as shown in FIG. 9, a resilient, flexible loop 78 having projections 80 and 82 may be mounted on the valve closure member 38 to engage a surface 84 on the inlet duct 20 facing the closure member and forming the valve seat 26. In another embodiment, shown in FIG. 10, a substantially rigid loop 86 having projections 88 and 90 may be mounted on the valve closure member 38, and a flexible, resilient substrate 92 may be mounted on a surface 94 of the inlet duct 20 facing the closure member. The substrate 92 is aligned with the loop 86 so that the projections 88 and 90 engage the substrate upon valve closure to form a fluid tight seal.

Valve and Sprinkler System Operation

Operation of the valve 12 and the fire suppression sprinkler system 10 are described with reference to FIGS. 1–3. With reference to FIG. 1, the system 10 is first charged to place it into a ready mode whereby it may respond to a fire condition. To charge the system 10, a control valve 96 positioned in conduit 24 is closed preventing pressurized water from source 14 from entering inlet duct 20. A charging valve 98 is then opened. Charging valve 98 is positioned within a charging conduit 100 that extends between main conduit 24 (upstream of control valve 96) and pressure chamber inlet 48. Also located in the charging conduit 100 are a strainer 102, a check valve 104 and a flow restrictor 106 (preferably an orifice plate). Strainer 102 keeps foreign matter from clogging the flow restrictor 106, check valve 104 prevents back flow from the pressure chamber to the main conduit 24, and restrictor 106 limits the rate of flow between the main conduit 24 and the pressure chamber 32. Limited flow through charging conduit 100 is desired during actuation of the system 10 as explained below.

With charging valve 98, open water flows from main conduit 24 into the pressure chamber 32. As it fills the pressure chamber 32, the water applies pressure to the diaphragm 36, thereby moving the valve closure member 38 from the open configuration shown in FIG. 3 to the closed position shown in FIGS. 1 and 2. After the pressure chamber 32 is filled, water enters an exhaust conduit 108 in fluid communication with the pressure chamber outlet 50. An actuator valve 110 controls the flow of water from the exhaust conduit 108 to the ambient. Actuator valve is normally closed, and opens during a fire condition to depressurize the pressure chamber and allow the valve to open. This is described in greater detail below.

An auto-vent 112 is positioned in the exhaust conduit 108 between the pressure chamber 32 and the actuator valve 110. The auto-vent prevents the system from repressurizing the pressure chamber and shutting itself down during a fire event should the actuator valve 110 close inadvertently. Auto-vent 112 comprises a housing 114 with a valve seat 116 engaged by a reciprocating piston 118 connected to a manually operated plunger 120. Piston 118 is biased out of engagement with seat 116 by a spring 122 allowing the exhaust conduit 108 to vent to the atmosphere through an exhaust outlet 124. During charging of the pressure chamber 32, the plunger 120 is manually drawn against the biasing spring 122 to engage piston 118 with seat 116 and close the auto-vent 112. When the pressure within the exhaust conduit 108 builds up to a predetermined pressure that can hold the piston 118 engaged with seat 116 against the biasing force of spring 122, the plunger is released and the auto-vent remains closed. The auto-vent 112, along with the actuator valve 110 and the check valve 104 maintain the pressure chamber 32 in a pressurized state and the valve closure member 38 in the closed configuration. The further operation of the auto-vent 112 and the actuator valve 110 are described below.

In the preferred dry-pipe pre-action system 10, the piping network 16, including the outlet duct 22, is charged with pressurized air. The control valve 96 is opened, allowing water from main conduit 24 to enter the inlet conduit 20. The valve closure member 38 is maintained in the closed configuration despite the hydraulic pressure against it within the inlet duct 20. Closure of the valve is maintained, despite the fact that the pressure on both sides of the closure member is substantially equal, because the wetted surface of the closure member 38 facing the pressure chamber 32 is greater than the wetted surface facing the inlet duct 20. This results in greater force being applied on the pressure chamber side to keep the valve 10 closed. The difference in wetted areas is due in large part to the area of the closure member 38 engaged by the valve seat 26, which is thus unavailable to the hydraulic pressure within the inlet duct 20. The pressure differential is further augmented by venting the space 62 between the spaced projections 58 and 60 to the atmosphere through aperture 64 as explained above (see FIG. 2). The system 10 as described is thus ready for action.

In the event of a fire condition, the sprinkler heads 18 in the vicinity of the fire open in response to the heat, allowing the pressurized air within the piping network 16 to vent, reducing the pressure within the network. This pressure reduction in the piping network 16 is communicated to the actuator valve 110. Actuator valve 110 is preferably a pressure controlled accelerator as described and claimed in U.S. Pat. No. 6,293,348, hereby incorporated by reference. The drop in air pressure within piping network 16 causes actuator valve 110 to open, thereby allowing water to flow from the pressure chamber 32. This depressurizes pressure chamber 32 and the hydraulic pressure in inlet duct 20 forces valve closure member 38 to pivot about axis 46 into the open configuration shown in FIG. 3. Water flows from the inlet duct 20 through outlet duct 22 and into the piping network 16 where it is discharged from open sprinkler heads 18 onto the fire. When the seat engaging surface 44 of the valve closing member 38 moves away from seat 26, it exposes aperture 64 to the pressurized water within the valve 12. This water is allowed to vent to the ambient through a mechanical alarm 126 having, for example, a bell and a clapper driven by a turbine. As the water rushes through the alarm 126, it powers the turbine and sounds the alarm, signaling that the system has been activated.

Upon opening of the actuator valve 110, the pressure chamber depressurizes despite the fact that it is in fluid communication with the pressurized water source 14 through charging conduit 100.

Depressurization is made possible by the action of the flow restrictor 106, which prevents water from entering the pressure chamber 32 faster than it can leave through exhaust conduit 108.

Once the pressure within exhaust conduit 108 drops to a predetermined level wherein it cannot produce sufficient force to keep piston 118 engaged with seat 116 against the biasing force of spring 122, the auto-vent 112 opens, venting the exhaust conduit 108 to the atmosphere. The piston 118 is sized relatively to the valve housing 114 such that water passing by it and out through the exhaust outlet 124 cannot reclose the auto-vent, which may only be closed manually. Thus, if the actuator valve 110 closes inadvertently during a fire condition, the system 10 will not re-pressurize the pressure chamber 32 and shut down the valve 12 because the auto-vent keeps the pressure chamber 32 de-pressurized until it is manually closed.

Diaphragm valves with pivoting closure members and elliptical seats provide a fluid control valve suited for use in fire suppression sprinkler systems. Such valves have lower relative pressure loss, are more compact, lighter in weight and have fewer moving parts than more conventional valves currently in use.

What is claimed is:

1. A valve for controlling fluid flow, said valve comprising:
   an inlet duct;
   an outlet duct in fluid communication with said inlet duct;
   a seat positioned between said inlet duct and said outlet duct;
   a pressure chamber positioned in facing relation with said seat;
   a closure member positioned between said pressure chamber and said seat and having a seat engaging surface facing said seat, said closure member being pivotable about an axis to bring said seat engaging surface into and out of sealing engagement with said seat to open and close said valve; and
   a diaphragm sealingly partitioning said pressure chamber from said outlet duct, said diaphragm being positioned between said pressure chamber and said closure member and attached thereto, said diaphragm being flexible and transferring pressure from said pressure chamber onto said closure member, said closure member being pivoted into sealing engagement with said seat when said pressure chamber is pressurized, thereby closing said valve, said closure member being pivotable out of engagement with said seat when said pressure chamber is depressurized, thereby allowing said valve to open.

2. A valve according to claim 1, wherein said seat has a non-circular shape.

3. A valve according to claim 2, wherein said seat has an elliptical shape.

4. A valve according to claim 3, wherein said inlet duct is substantially coaxially aligned with said outlet duct.

5. A valve according to claim 4, wherein said seat is angularly oriented relatively to said inlet and outlet ducts.

6. A valve according to claim 1, wherein said seat comprises a loop having an inner and an outer perimeter, a first projection extending along said inner perimeter, and a second projection extending along said outer perimeter, both of said projections facing said valve closure member for sealing engagement therewith upon pivoting of said valve closure member, said first and second projections being in spaced apart relation to each other and defining a space between them.

7. A valve according to claim 6, wherein said loop is comprised of a flexible, resilient material.

8. A valve according to claim 6, further comprising an aperture extending through said seat and providing fluid communication between said space and a region external to said valve.

9. A valve according to claim 8, wherein said aperture is vented to the ambient.

10. A valve for controlling fluid flow, said valve comprising:
    an inlet duct;
    an outlet duct in fluid communication with said inlet duct;
    a seat positioned between said inlet duct and said outlet duct;
    a closure member positioned between said inlet duct and said outlet duct and having a seat engaging surface facing said seat, said closure member being pivotable about an axis to bring said seat engaging surface into and out of sealing engagement with said seat to open and close said valve; and
    a loop mounted on one of said seat and said valve closure member, said loop having an inner and an outer perimeter, a first projection extending along said inner perimeter, and a second projection extending along said outer perimeter, both of said projections facing the other of said seat and said valve closure member for sealing engagement therewith upon pivoting of said valve closure member, said first and second projections being in spaced apart relation to each other and defining a space between them.

11. A valve according to claim 10, wherein said loop is mounted on said seat.

12. A valve according to claim 11, wherein said loop comprises a flexible, resilient material.

13. A valve according to claim 10, wherein said seat has a non-circular shape.

14. A valve according to claim 13, wherein said seat has an elliptical shape.

15. A valve according to claim 14, wherein said seat is angularly oriented relatively to said inlet and outlet ducts.

16. A valve according to claim 10, further comprising an aperture extending through said seat and providing fluid communication between said space and a region external to said valve when said seat engaging surface engages said seat.

17. A valve according to claim 16, wherein said aperture is vented to the ambient.

18. A valve according to claim 10, further comprising:
    a pressure chamber positioned adjacent to said closure member; and
    a diaphragm sealingly positioned between said pressure chamber and said closure member and attached thereto, said diaphragm being flexible and transferring pressure from said pressure chamber onto said closure member, said closure member being pivoted into sealing engagement with said seat when said pressure chamber is pressurized, thereby closing said valve, said closure member being pivotable out of engagement with said seat when said pressure chamber is depressurized, thereby allowing said valve to open.

19. A sprinkler system for fire suppression, said system comprising:
    a source of pressurized water;
    a plurality of sprinkler heads for distributing said water;
    a piping network providing fluid communication between said source of pressurized water and said sprinkler heads;
    a first valve connected in said piping network between said source of pressurized water and said sprinkler heads, said first valve comprising:
    an inlet duct connected to said piping network; an outlet duct connected to said piping network, said outlet duct being in fluid communication with said inlet duct;
    a seat positioned between said inlet duct and said outlet duct;
    a pressure chamber positioned in facing relation with said seat;

a first conduit providing fluid communication between said source of pressurized water and said pressure chamber;

a second conduit providing fluid communication between said pressure chamber and the ambient;

a closure member positioned between said pressure chamber and said seat and having a seat engaging surface facing said seat, said closure member being pivotable about an axis to bring said seat engaging surface into and out of sealing engagement with said seat to open and close said first valve;

a diaphragm sealingly positioned between said pressure chamber and said closure member and attached thereto, said diaphragm being flexible and transferring pressure from said pressure chamber onto said closure member, said closure member being pivoted into sealing engagement with said seat when said pressure chamber is pressurized, thereby closing said first valve, said closure member being pivotable out of engagement with said seat when said pressure chamber is depressurized, thereby allowing said first valve to open; and a second valve positioned in said second conduit and regulating the flow of water from said pressure chamber to the ambient to open and close first said first valve.

20. A sprinkler system according to claim 19, wherein said seat has a non-circular shape.

21. A sprinkler system according to claim 20, wherein said seat has an elliptical shape.

22. A sprinkler system according to claim 21, wherein said inlet duct is substantially coaxially aligned with said outlet duct.

23. A sprinkler system according to claim 22, wherein said seat is angularly oriented relatively to said inlet and outlet ducts.

24. A sprinkler system according to claim 19, wherein said seat comprises a loop having an inner and an outer perimeter, a first projection extending along said inner perimeter, and a second projection extending along said outer perimeter, both of said projections facing said valve closure member for sealing engagement therewith upon pivoting of said valve closure member, said first and second projections being in spaced apart relation to each other and defining a space between them.

25. A sprinkler system according to claim 24, wherein said loop is comprised of a flexible, resilient material.

26. A sprinkler system according to claim 24, further comprising an aperture extending through said seat and providing fluid communication between said space and a region external to said first valve.

27. A sprinkler system according to claim 26, wherein said aperture is vented to the ambient.

28. A sprinkler system according to claim 26, further comprising an alarm in fluid communication with said aperture, said alarm being triggered by flow of said water through said aperture upon opening of said first valve.

* * * * *